Aug. 16, 1932.     A. M. JENSEN     1,872,460
SHOCK ABSORBER
Filed Dec. 19, 1928
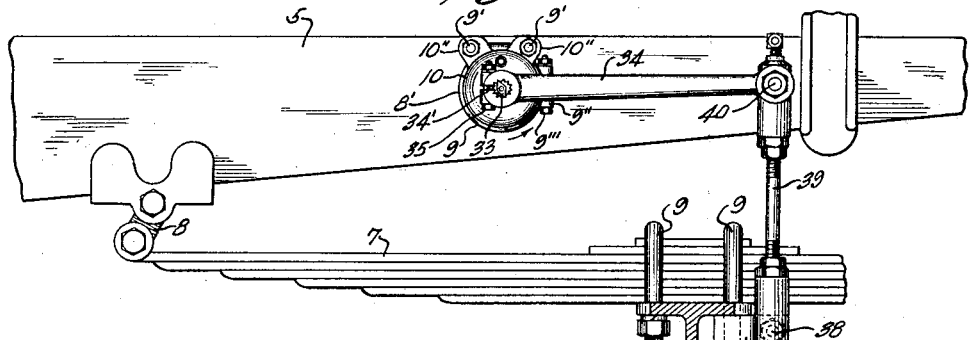
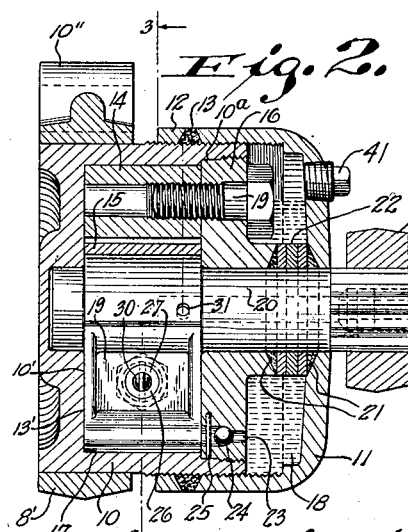
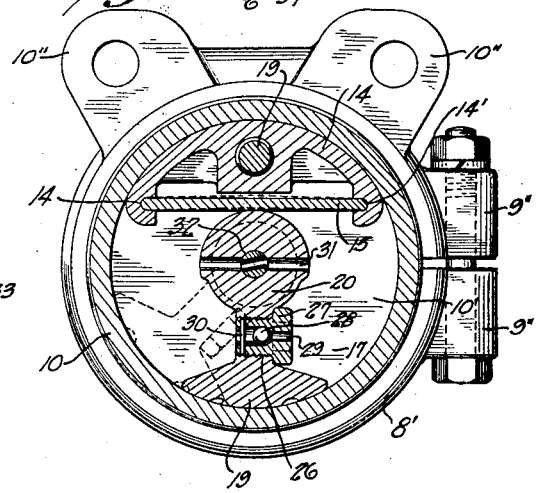
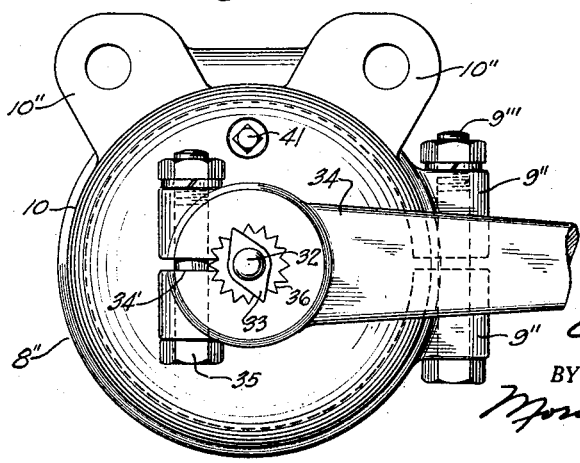
INVENTOR.
Alfred M. Jensen
BY
Morsell, Keeney, & Morsell
ATTORNEYS.

Patented Aug. 16, 1932

1,872,460

UNITED STATES PATENT OFFICE

ALFRED M. JENSEN, OF RACINE, WISCONSIN, ASSIGNOR TO HARVEY SPRING & FORGING CO., OF RACINE, WISCONSIN, A CORPORATION OF WISCONSIN

SHOCK ABSORBER

Application filed December 19, 1928. Serial No. 326,982.

This invention relates to improvements in shock absorbers more particularly but not solely adapted for automobile use.

The ordinary vehicle springs permit the body to descend in riding over obstacles on the road, and upon the rebound of the springs the body is thrown upwardly and thereby does not conduce to the comfort of the occupants of the vehicle. Many devices have come into use for preventing or absorbing these rebound movements, but in most of them the devices check the minimum as well as the maximum jolts, with the result that free and desirable action of the vehicle springs are retarded or obstructed in riding over slight undulations of the road.

It is one of the objects of the present invention to overcome the above mentioned objectionable features and provide a shock absorber which will permit the free movement of the springs of the vehicle in passing over slight road undulations, but will check or retard the excessive movement of the springs in passing over larger obstructions.

A further object of the invention is to provide a shock absorber which may be easily connected to and adjusted to fit the frames and load of ordinary automobiles now on the market.

A further object of the invention is to provide a shock absorber in the form of a circular chamber having an oscillating piston which has a partly unobstructed movement in one direction, a retarded movement in the other direction and a means for relieving the retardation when the movement is excessive.

A further object of the invention is to provide a shock absorber having means for automatically maintaining the sector chamber filled with the retarding medium.

A further object of the invention is to provide a shock absorber which is of simple construction, is strong and durable and is well adapted for the purpose described.

With the above and other objects in view the invention consists of the improved shock absorber and its parts and combinations as set forth in the claims and all equivalents thereof.

In the accompanying drawing in which the same reference characters indicate the same parts in all of the views:

Fig. 1 is a fragmentary view of a portion of a vehicle frame and axle showing the improved shock absorber connected thereto;

Fig. 2 is a vertical sectional view on a larger side of one portion of the absorber;

Fig. 3 is a vertical sectional view taken on line 3—3 of Fig. 2; and

Fig. 4 is a front view of the parts shown in Fig. 2, a part broken away.

Referring to the drawing, the numeral 5 indicates a portion of one of the side members of a motor vehicle, 6 the transverse axle, and 7 the elliptical leaf spring yieldingly connecting the two parts together. One end portion of the springs has a link connection 8 with the frame, and another portion has U-bolt clip connections 9 with the axle 6.

The improved shock absorber comprises a circular casing 8 having a cover 11 and a packing nut 12 threaded thereon. Packing 13 interposed between the cover and the nut seals the connection between the casing and the cover. The inner side of the casing 10 is formed with a flat face 10' against which and the inner upper face of the casing, is closely mounted a spring holding member 14 having inner side grooves 14' for receiving a flat spring compensator member 15. The circular portion of the casing 10 is formed with an inner annular shoulder 10ª against which is secured a partition plate 16 to divide the chamber formed by the casing and the cap into an inner piston chamber 17 and an outer oil supply chamber 18. The partition plate 16 is threaded into the casing and a bolt 19 extending through the plate 16 and threaded into the member 14 holds the plate 16 in position. The casing 10 which may be formed in one piece, is preferably made in two parts and the attaching part 8' is in the form of a circular split bracket 8' into which the casing 10 extends. The bracket portion 8' is formed with attaching eyed ears 10" for bolts 9' and also with eyed lugs 9" for receiving a bolt 9''' for clamping the casing 10 adjustably to the bracket 8'.

An oscillating piston 19 fitting snugly within the chamber 17 is provided with an outwardly projecting shaft 20 which extends through and is journaled in the partition plate 16 and the cap member 11. The said shaft 20 while preferably formed integral with the oscillatory piston may be formed separate therefrom and the piston connected thereto. The inner end portion of the piston is journaled in the casing 10. Packing 21 and packing collars 22 extend around the shaft and are interposed between the partition plate and the cap to seal the shaft bearing from leakage of oil or other medium from the piston chamber 17 into the outer chamber 18, or from the outer chamber 18 through the shaft bearing of the cap 11.

The lower portion of the partition plate is provided with an opening 23 which is enlarged adjacent the casing chamber 17 to receive a ball check valve 24. A pin 25 retains the ball valve and controls the supply of oil or other medium from the supply chamber 18 to the piston chamber 17. From time to time the oil from the supply chamber may be drawn through the plate opening and into the casing chamber to keep said chamber entirely filled with oil.

The piston 19 is also provided with an opening 26 into which is threaded a check valve casing 27 having a ball check valve 28 in opening 29 extending through the valve casing 27 and opening communication between the spaces of the chamber 17 on opposite sides of the piston. A pin 30 holds the ball 28 in the enlarged portion of the bore. The downward movement of the chassis upon which absorber is mounted will swing the piston to open the valve, and an upward movement of the chassis will close the valve.

The piston shaft 20 within the piston chamber is formed with a transverse bore or duct 31 controlled by a rotary valve 32 the stem of which extends outwardly through a longitudinally extending bore in the shaft 20. A handle 33 mounted on the valve stem provides for adjusting the valve opening with relation to the bore 31 of the shaft 20 to by-pass or control the flow of oil through said bore from one side of the piston to the other.

The outer end portion of the shaft 20 is ribbed or grooved to adjustably receive the split end portion 34' of the crank arm 34. A bolt 35 extending through the split portion and having a nut threaded on its end clamps the arm firmly to the shaft end. The bore 36 of the crank shaft is ribbed or grooved to fit the ribbed portion of the shaft.

A block 37 mounted on one of the U-clips 9 is provided with a projecting pin 38 which fits within a ball socket in the lower portion of an adjustable connecting link 39. The upper end portion of the link 39 is also formed with a ball socket to receive the rounded end portion of a pin 40 projecting inwardly from the arm 34. The link 39 is adjustable as to length by means of the right and left handed threaded engagement of the rod with the end portions of the link in the well known manner.

A plug 41 tapped in the cover provides for filling the reservoir and casing with the oil or other medium used.

In operation, the reservoir and piston chamber are filled with oil or other medium and the parts are attached in the manner shown, with the piston located centrally of its arc of movement. If the vehicle is now driven over slight undulations in the road, the leaf springs will give slightly and the relative vertical movement of the axle with respect to the frame will rock the arm 34 slightly, and while moving slightly, the oil will pass from one side of the piston to the other through the adjustable by-pass bore or duct 31 and in one direction through the valved opening 29 without retarding the movement of the piston. If the vehicle is now driven over larger obstructions, on the upward movement of the axle or the downward movement of the frame the piston will be swung to the right, referring to Fig. 3, and the movement will open the valve 28 and permit a more free movement of the piston to the end of its stroke. Upon the return stroke of the piston the ball valve will close the duct 29 and the upward movement of the frame or the downward movement of the axle will be retarded due to the fact that the oil will have to pass through the small duct 31 and thus prevent violent shocks or rebound. In the event of very violent movements of the parts excessive pressure on the oil will be created by the piston and this pressure will flex the spring compensator member 15 upwardly, as indicated by dotted lines in Fig. 3, and permit the oil to flow between the piston and the spring member and thus relieve the strain of the excessive pressure and eliminate the shocks being imparted to the vehicle body. If any of the oil or other medium within the piston chamber should leak out, it will be automatically replaced from the reservoir chamber by the movement of the piston.

From the foregoing description it will be seen that the shock absorber does not interfere with the normal slight movements of the springs, but does gradually retard the greater movements and in the event of very excessive movements the compensator member will relieve the same and thus conduce to more comfortable riding.

It will further be seen that the shock absorber is of very simple construction, and is well adapted for the purpose desired.

What I claim as my invention is:

1. A shock absorber, comprising a casing having an inner curved surface and opposite flat side walls, an oscillating piston having a concentric hub portion and positioned within the casing and dividing the casing into two compartments, a shaft connected to the piston and projecting out of the casing, a yielding member within the chamber in which the piston oscillates and engaging the concentric hub portion and engaged by the fluid medium on opposite sides of the piston for permitting the flow of the medium from one side of the piston to the other when subjected to excessive pressure, an arm mounted on the outer end portion of the shaft and extending outwardly therefrom, an attaching member pivotally connected to the outer end portion of the arm, said piston and shaft having a duct connecting the two compartments and means for controlling the flow of a fluid medium through the duct, and a check valve in communication with both compartments for stopping the flow of the medium from one compartment to the other while the piston is moving in one direction but permitting the flow of the fluid medium through the check valve while the piston is moving in the opposite direction.

2. A shock absorber, comprising a casing having an inner curved surface and opposite flat side walls, an oscillating piston having a concentric hub portion positioned within the casing and dividing the casing into two compartments, a shaft connected to the piston and projecting out of the casing, a yielding flat spring member within the chamber in which the piston oscillates and engaging the concentric hub portion and engaged by the fluid medium on opposite sides of the piston for permitting the flow of the medium from one side of the piston to the other when subjected to excessive pressure, an arm mounted on the outer end portion of the shaft and extending outwardly therefrom, an attaching member pivotally connected to the outer end portion of the arm, said piston and shaft having a duct connecting the two compartments and means for controlling the flow of a fluid medium through the duct, a fluid medium supply chamber for automatically maintaining the two compartments filled with the fluid medium, and a check valve in communication with both compartments for stopping the flow of the medium from one compartment to the other while the piston is moving in one direction but permitting the flow of the fluid medium through the check valve while the piston is moving in the opposite direction.

3. A shock absorber, comprising a casing having an inner curved surface and opposite flat side walls, an oscillating piston having a concentric hub portion positioned within the casing and dividing the casing into two compartments, a shaft connected to the piston and projecting out of the casing, a yielding flat spring member within the chamber in which the piston oscillates and engaging the concentric hub portion and engaged by the fluid medium on opposite sides of the piston for permitting the flow of the medium from one side of the piston to the other when subjected to excessive pressure, an arm mounted on the outer end portion of the shaft and extending outwardly therefrom, an attaching member pivotally connected to the outer end portion of the arm, said piston and shaft having a duct connecting the two compartments and means for controlling the flow of a fluid medium through the duct, a fluid medium supply chamber connected to the casing and having a check valved opening in communication with the two compartments for automatically maintaining the two compartments filled with the fluid medium, and a check valve in communication with both compartments for stopping the flow of the medium from one compartment to the other while the piston is moving in one direction but permitting the flow of the fluid medium through the check valve while the piston is moving in the opposite direction.

4. A shock absorber, comprising a casing having an inner curved surface and an inner side wall, a partition member mounted on the casing and forming the outer side wall of the casing, a cap member connected to the casing and having a portion spaced from the partition member to form a fluid medium storage chamber, a holding member within the casing and having spaced grooves, a shaft journaled in and extending through the partition member and the cap member, a piston within and having a concentric hub portion carried by the shaft and dividing the casing into two compartments, a yielding flat spring member within the casing and entering the holding member grooves and engaging the concentric hub portion and solely movable to permit the flow of the fluid medium from one compartment to the other when under excessive fluid pressure, said piston and shaft having a transverse duct connecting the two compartments together, a valve controlling the duct and having a stem projecting outwardly from the shaft, said piston having a transverse duct controlled by a check valve for permitting the flow of the fluid medium from one compartment to the other in one direction of movement of the piston but preventing movement of the fluid medium through the duct when the piston is moving in the opposite direction, and an arm connected to the shaft outside of the casing and having an attaching member at its outer end portion.

5. A shock absorber, comprising a casing having an inner curved surface and an inner side wall, a partition member mounted on the casing, a cap member connected to the casing and having a portion spaced from the partition member to form a fluid medium storage chamber, a holding member within the casing and having spaced grooves, a shaft journaled in and extending through the partition member and the cap member, a piston having a concentric hub portion within and carried by the shaft and dividing the casing into two compartments, a yielding spring member within the casing and having its opposite ends extending into grooves of the holding member, a medial portion of the spring member engaging the shaft and movable to permit the flow of the fluid medium from one compartment to the other when under excessive pressure, said piston and shaft having a transverse duct connecting the two compartments together, a valve controlling the duct and having a stem projecting outwardly from the shaft, said piston having a transverse duct controlled by a check valve for permitting the flow of the fluid medium from one compartment to the other in one direction of movement of the piston but preventing movement of the fluid medium through the duct when the piston is moving in the opposite direction, and an arm connected to the shaft outside of the casing and having an attaching member at its outer end portion.

In testimony whereof, I affix my signature.

ALFRED M. JENSEN.